(12) United States Patent
Worl et al.

(10) Patent No.: US 8,188,932 B2
(45) Date of Patent: May 29, 2012

(54) PHASED ARRAY ANTENNA WITH LATTICE TRANSFORMATION

(75) Inventors: Robert T. Worl, Maple Valley, WA (US); Julio A. Navarro, Kent, WA (US); Richard N. Bostwick, North Bend, WA (US); Peter T. Heisen, Kent, WA (US)

(73) Assignee: The Boeing Company, Chicago, IL (US)

( * ) Notice: Subject to any disclaimer, the term of this patent is extended or adjusted under 35 U.S.C. 154(b) by 924 days.

(21) Appl. No.: 11/955,102

(22) Filed: Dec. 12, 2007

(65) Prior Publication Data

US 2009/0153426 A1   Jun. 18, 2009

(51) Int. Cl.
 *H01Q 13/00* (2006.01)
(52) U.S. Cl. ............................................. 343/776
(58) Field of Classification Search ............... 343/772, 343/776, 786
 See application file for complete search history.

(56) References Cited

U.S. PATENT DOCUMENTS

| 6,201,508 | B1 | 3/2001 | Metzen et al. | |
|---|---|---|---|---|
| 6,768,471 | B2 * | 7/2004 | Bostwick et al. | 343/853 |
| 6,975,267 | B2 | 12/2005 | Stenger et al. | |
| 7,132,990 | B2 | 11/2006 | Stenger et al. | |
| 7,423,604 | B2 * | 9/2008 | Nagai | 343/776 |
| 7,817,100 | B2 * | 10/2010 | Navarro et al. | 343/872 |
| 2003/0128812 | A1 | 7/2003 | Appleby et al. | |
| 2005/0200531 | A1 | 9/2005 | Huang et al. | |
| 2010/0231475 | A1 * | 9/2010 | Ou et al. | 343/776 |

FOREIGN PATENT DOCUMENTS

| EP | 0893842 A | 1/1999 |
|---|---|---|
| WO | 9723923 A1 | 7/1997 |

OTHER PUBLICATIONS

Yamauchi et al., "Analysis of the far-field pattern of an optical waveguide array using the finite-difference beam-propagation method", IEEE Proceedings: Microwaves, antennas and Propagation, Stevenage, Herts, GB, Apr. 14, 1998, vol. 145, No. 2, pp. 175-177.

EP Search Report Sep. 21, 2009 for application No. 08075913.7-2220/2071669.

* cited by examiner

*Primary Examiner* — Jacob Y Choi
*Assistant Examiner* — Robert Karacsony
(74) *Attorney, Agent, or Firm* — Yee & Associates, P.C.

(57) ABSTRACT

Structure and method for an aperture plate for use in a phased array antenna is disclosed. The aperture plate includes a plurality of waveguide transitions, each with a radiating end, a coupling end and a body portion extending from the radiating end to the coupling end. The waveguide transitions are spaced apart from each other wherein at least a pair of waveguide transitions are spaced apart closer to each other at the radiating end than at the coupling end. The method of manufacturing an aperture plate for a phased array antenna includes sizing a plurality of waveguide transitions based upon certain operating requirements, determining a radiating lattice spacing and configuration based upon the operating requirements, determining a coupling lattice spacing and configuration based upon antenna electronics packaging, optimizing an aperture plate thickness to achieve the radiating lattice and the coupling lattice spacing and configuration, and forming the aperture plate.

14 Claims, 11 Drawing Sheets

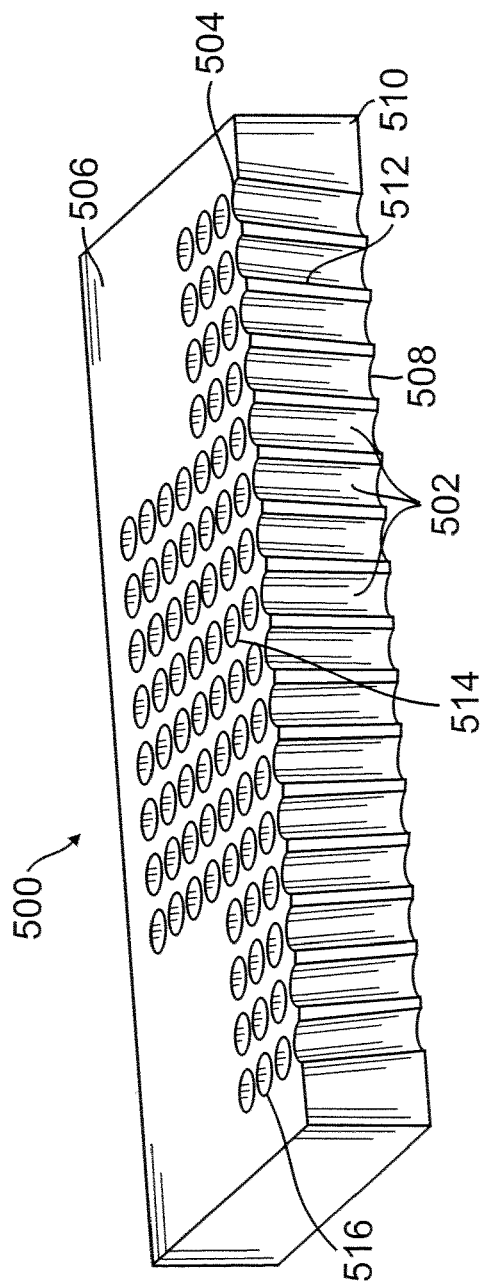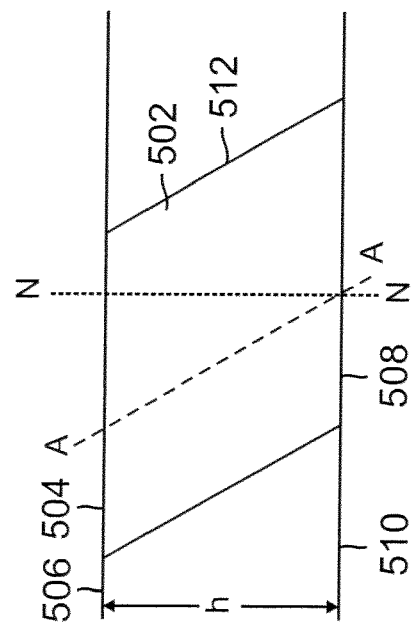
FIG. 5
FIG. 5a

PHASED ARRAY ANTENNA WITH LATTICE TRANSFORMATION

CROSS REFERENCE TO RELATED APPLICATIONS

NONE

BACKGROUND

1. Field of the Disclosure

This disclosure is directed to phased array antennas, and more particularly to phased array antenna aperture plate with lattice transformation.

2. Related Art

An example Phased array antenna is comprised of an aperture plate, multiple antenna elements, element control circuits, a signal distribution network, signal control circuitry, a power supply and a mechanical support structure. The aperture plate is comprised of a plurality of holes that serve as waveguide transitions from an antenna element to free-space. The total gain, effective isotropic radiated power ("EIRP") (with a transmit antenna), maximum grating-lobe-freescan angle, and side lobe level requirements of the antenna are directly related to the number of antenna elements in the antenna, individual antenna element spacing and performance of the antenna elements and element electronics. In many applications, thousands of independent element/control circuits are used to achieve a desired antenna performance.

A phased array antenna typically uses independent electronic packages for the antenna elements and control circuits that are intercoupled through a series of external connectors. As the beam scan angle increases, the spacing between the phased array antenna elements decreases. The spacing between the phased array antenna elements also decreases when the frequency increases. As the spacing of the antenna elements decreases, it becomes increasingly difficult to physically configure the control electronics relative to the tight antenna element spacing. This can affect the performance of the antenna and/or increase its cost, size and complexity. Consequently, the performance of a phased array antenna becomes limited by the need to tightly package and interconnect the antenna elements and the element electronics associated therewith a plurality of external connectors.

Additionally, as the antenna element spacing is reduced due to either frequency scaling or increase in scan angle, the corresponding element electronics does not necessarily scale down in size.

Therefore, there is need for a structure and method for producing low cost phased array antenna.

SUMMARY OF THE DISCLOSURE

In one aspect, an aperture plate for a phased array antenna having a plurality of waveguide transitions is provided. Each of the waveguide transitions have a radiating end and a coupling end and a body portion extending from the radiating end to the coupling end. The plurality of waveguide transitions are spaced apart from each other wherein at least a pair of waveguide transitions are spaced apart closer to each other at the radiating end than at the coupling end. The antenna further includes a plurality of antenna elements, each antenna element operatively coupled to a waveguide transition at the coupling end.

In another aspect, a method of manufacturing an aperture plate for a phased array antenna is disclosed. The method includes sizing a plurality of waveguide transitions based upon certain operating requirements; determining a radiating lattice spacing and configuration based upon the operating requirements; determining a coupling lattice spacing and configuration based upon antenna electronics packaging; optimizing an aperture plate thickness to achieve the radiating lattice and the coupling lattice spacing and configuration; and forming the aperture plate.

In yet another aspect a phased array antenna comprising an aperture plate with a plurality of waveguide transitions, each waveguide transition having a radiating end and a coupling end and a body portion extending from the radiating end to the coupling end, the plurality of waveguide transitions spaced apart from each other wherein at least a pair of waveguide transitions are spaced apart closer to each other at the radiating end than at the coupling end; and a plurality of antenna elements operatively coupled to one or more of the waveguide transitions at the coupling end is disclosed.

This brief summary has been provided so that the nature of the disclosure may be understood quickly. A more complete understanding of the disclosure may be obtained by reference to the following detailed description of embodiments thereof in connection with the attached drawings.

BRIEF DESCRIPTION OF THE DRAWINGS

The foregoing features and other features of the present disclosure will now be described with reference to the drawings. In the drawings, the same components have the same reference numerals. The illustrated embodiment is intended to illustrate, but not to limit the disclosure. The drawings include the following figures:

FIGS. 5 and 5a show partial cross-sectional views of an aperture plate and waveguide transition for use with an embodiment of the current disclosure;

DETAILED DESCRIPTION

To facilitate an understanding of the preferred embodiment, the general architecture of various embodiments of antenna for use with one or more embodiments of the aperture plate will be described. The specific architecture of the preferred embodiments of the aperture plate will then be described with reference to the general architecture.

Figure 1:
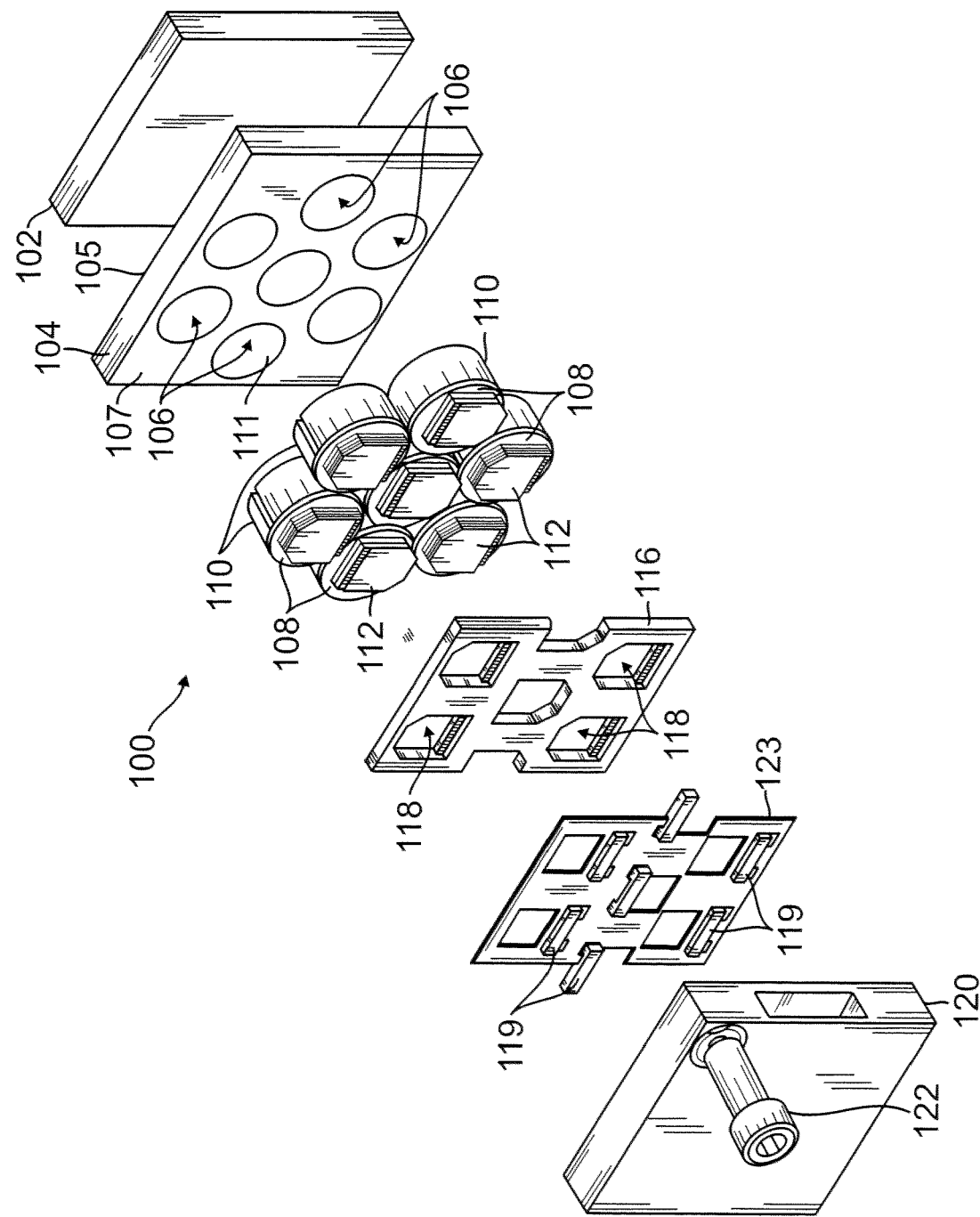
FIG. 1 shows an exploded perspective of a portion of an exemplary antenna for use with an embodiment of the present disclosure.

FIG. 1 shows an exploded perspective of a portion of exemplary antenna 100 for use with an embodiment of the present invention. Antenna 100 includes a wide angle impedance matching (WAIM) structure 102, which serves as a cover for the antenna. WAIMs are well known in the art of phased-array antennas.

Antenna 100 also includes an aperture plate 104 with a plurality of waveguide transitions 106. The aperture plate 104 includes a top surface 105, facing the WAIM structure 102 and a bottom surface 107. The waveguide transitions 106 have a radiating end (not shown) and a coupling end 111. The waveguide transition 106 extends from the radiating end about the top surface 105 to the coupling end 111 about the bottom surface 107. Waveguide transitions 106 may be loaded with a suitable dielectric, such as, for example, cross-linked polystyrene, which is available as Rexolite™.

Antenna 100 also includes a plurality of antenna elements 108 aligned with coupling end 111 of the waveguide transitions 106 of aperture plate 104. In this embodiment, each antenna element 108 is surrounded by a sleeve 110 and is placed in operative position adjacent to the coupling end 111 of a corresponding waveguide transition 106 in aperture plate 104, whereby antenna elements 108 receive signals through waveguide transitions 106. According to an embodiment of this disclosure, the radiating end of the waveguide transitions 106 may be spaced apart differently than the coupling end 111 of the waveguide transitions 106. Detailed description of various embodiments of the aperture plate 106 will be described later.

In this embodiment, each antenna element 108 includes a sleeve 110 coupled around a connecting waveguide. The associated connecting waveguide of each antenna element 108 is at one end of the antenna element 108 and is placed in contact with aperture plate 104 and aligned with a corresponding waveguide transition 106. Sleeves 110 facilitate the electromagnetic (EM) coupling between receiving waveguide transitions 106 and the connecting waveguides of antenna elements 108. Each Sleeve 110 also serves to thicken the corresponding antenna element's connecting waveguide wall to form a waveguide butt connection to the corresponding waveguide transition 106 of aperture plate 104. Although sleeves are described in this embodiment of antenna elements 108, other retaining devices, such as, for example, springs or clips can be used in other embodiments.

Each antenna element 108 also includes a semiconductor package 112 on the opposite end of the antenna element 108 that is keyed. Each semiconductor package 112 also includes a polarity switch, amplifiers, phase shifters and a logic circuit, all well known in the art. The semiconductor package of each antenna element amplifies, combines (i.e., combines the linearly polarized component signals of the received circularly polarized DBS signal), and phase shifts received DBS signals, which it then outputs as a radio frequency (RF) output signal.

A multilayer wiring board 116 has keyed cutouts or openings 118 shaped and positioned to receive the keyed semiconductor packages 112 of antenna elements 108 so that the antenna elements 108 are aligned with the corresponding coupling end 111 of the waveguide transitions 106 of aperture plate 104. Sleeves 110 of antenna elements 108 accommodate misalignment and slight length differences of antenna elements 108 and provide contact area with the coupling end 111 of the waveguide transitions 106 of aperture plate 104. The inclusion of multilayer wiring board 116 eliminates the need for a more costly module honeycomb as is required in some other phased-array antennas.

Multilayer wiring board 116 serves as an interconnect structure providing conductive paths between the modules and the power conditioners (not shown). Multilayer wiring board 116 also includes conductive traces for carrying control signals for controlling the phase shifters of antenna elements 108.

In this exemplary embodiment, multilayer wiring board 116 also includes striplines (not shown) for propagating the RF signals, as well as conductors for the control signals from controller (not shown) and power from power conditioner (not shown). More specifically, multilayer wiring board 116 includes a stripline routed to each opening 118 for propagating the REF output signal from each antenna element 108. The striplines corresponding to a group of antenna elements are combined using power combiners in multilayer wiring board 116. Elastomeric connectors 119 electrically connect antenna elements 108 to multilayer wiring board 116 for power, logic and RF signals.

A pressure plate 120 is attached to aperture plate 104 with fasteners 122. Fasteners 122 can be, for example, screws, bolts, clamps, latches or any suitable type of fastener that can securely fasten pressure plate 120 to aperture plate 104 and yet be easily removed. In this embodiment, fasteners 122 are bolts. Fasteners 122 are tightened so that pressure plate 120, together with support shim 123, compress elastomeric connectors 119 against connector contacts of multilayer wiring board 116 and semiconductor package 112 of antenna elements 108, thereby providing good electrical contact between multilayer wiring board 116 and antenna element 108 without soldering. The solderless elastomeric connectors 119 facilitate assembly, maintenance and replacement. Further, using solderless connectors avoids failures during assembly induced by full board high temperature solder operations. In addition, solderless connectors increase reliability by eliminating relatively inflexible solder connections of conventional systems, which are sensitive to temperature cycling and vibration. Together with sleeves 110 and the keying in multilayer wiring board 116, the compressive force of fasteners 122 on pressure plate 120 and aperture plate 104 help keep antenna elements 108 aligned with coupling end 111 of the waveguide transitions 106.

Figure 2:
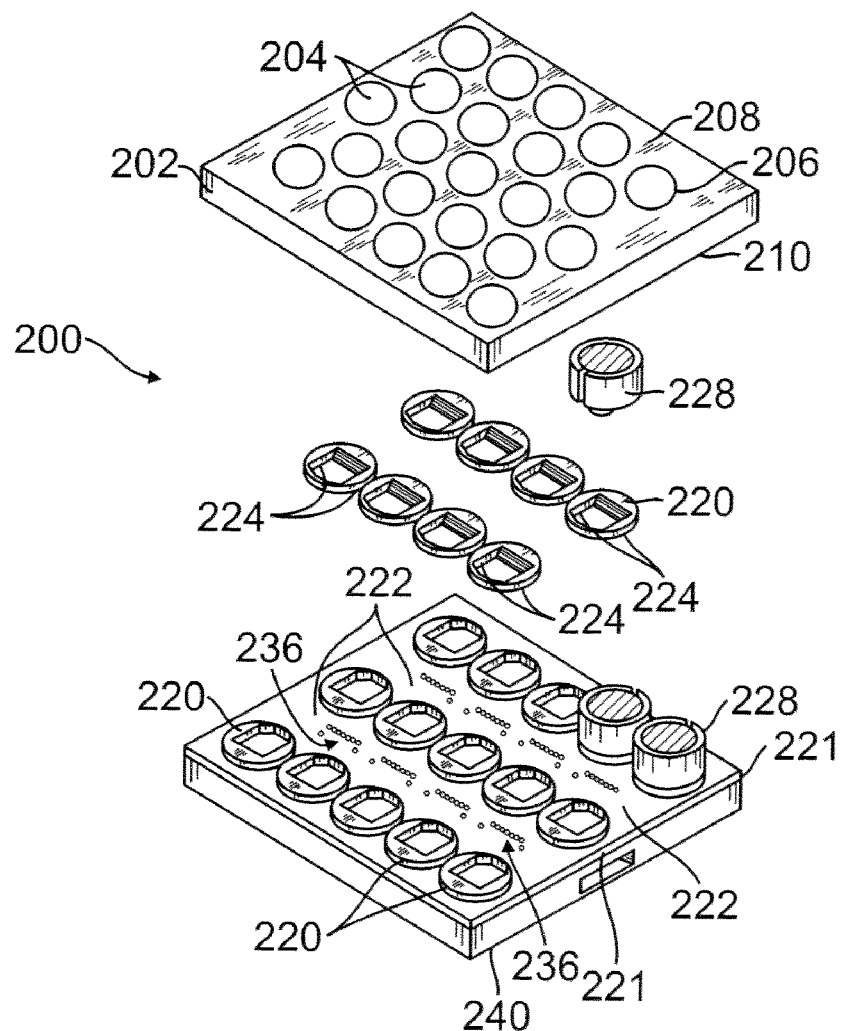
FIG. 2 is an exploded perspective of an alternative exemplary antenna for use with an embodiment of the present disclosure.

FIG. 2 is an exploded perspective of an alternative embodiment of a phased array antenna 200 with aperture plate 202 of the current disclosure. The aperture plate 202 includes a plurality of waveguide transitions 204. The aperture plate 202 includes a top surface 208 and a bottom surface 210. The waveguide transition 204 includes a radiating end 206, a body portion (not shown) and a coupling end (not shown). The waveguide transition 204 extends from the radiating end 206 about the top surface to the coupling end about the bottom surface 210. The antenna elements 228 are operatively coupled to the coupling end of the waveguide transition 204 on one end and operatively coupled to the multilayer wiring board 221 on the other end. The coupling end of the waveguide transition 204 are spaced apart to permit coupling of antenna elements 228 with corresponding waveguide transitions 204. According to an embodiment of this disclosure, the radiating end 206 of the waveguide transitions 204 may be spaced apart differently than the coupling end of the waveguide transitions 204. Detailed description of various embodiments of the aperture plate 202 are described below.

Sockets 220 are used to couple the antenna elements 228 to multilayer wiring board 221 in a surface mount configuration. In the embodiment shown, antenna elements 228 are pressed against the multilayer wiring board with resilient sleeves. In other embodiments, springs can replace the sleeves. Multilayer wiring board 221 is substantially similar to multilayer wiring board 116 (FIG. 1) except that multilayer wiring board 221 includes alignment holes 222 for alignment pins on sockets 220 instead of the cutouts or openings 118 (FIG. 1) in multilayer wiring board 116. In addition, contacts 236 are located at the top surface of multilayer wiring board 221 instead of an intermediate layer as in multilayer wiring board 116.

Each socket 220 includes two alignment pins 224 extending from its bottom surface. Alignment pins 224 fit into alignment holes 222 in multilayer wiring board 221, whereby each socket 220 is aligned with a corresponding set of contacts 230. Sockets 220 are held in place by compression when pressure plate 240 is attached to aperture plate 202. Although alignment pins 224 are located on the bottom surface of socket 220 in the described embodiment, other embodiments may have the alignment pins on the top surface of the socket, with alignment holes in the bottom surface of the aperture plate 202.

Each socket 200 also includes fuzz button contact elements 234 (shown in FIG. 25) to make electrical contact with contacts 236 of multilayer wiring board 221 and with contacts of antenna elements 228. Thus, sockets 220 and fuzz button contact elements 234 provide conduction paths between antenna elements 228 and multilayer wiring board 221 in a nonplanar configuration as opposed to the planar propagation paths provided by cutouts 118 and elastomeric connectors between the antenna elements and multilayer wiring board 116 (of FIG. 1).

Sockets 220 eliminate the cutouts in multilayer wiring board 221, thereby improving the manufacturability of and decreasing the complexity and cost of multilayer wiring board 221, relative to multilayer wiring board 116 (FIG. 1).

Figures 2A, 2B:
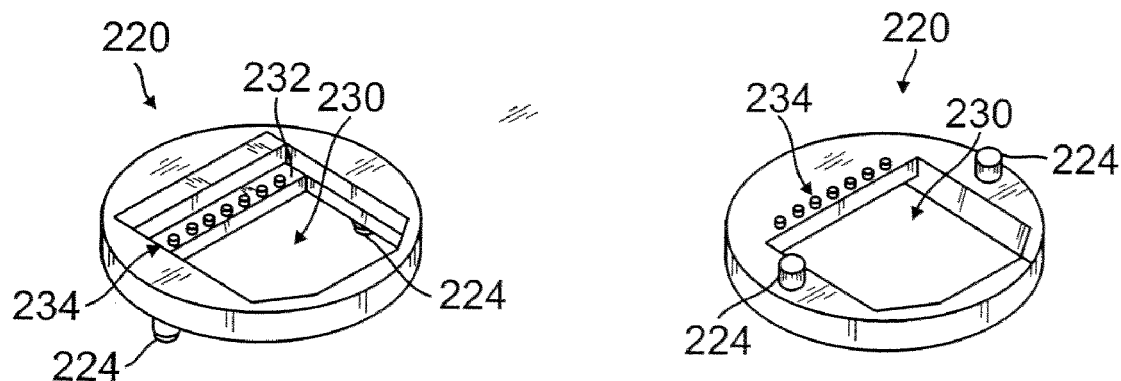
FIGS. 2a and 2b are top and bottom views, respectively, of one embodiment of a socket for use with the alternative exemplary antenna of FIG. 2.

FIGS. 2a and 2b are top and bottom perspectives, respectively, of one embodiment of a socket 220. Socket 220 includes a cutout 230, keyed to receive a semiconductor package (not shown) that is part of the antenna element 228. Cutout 230 has a ledge 232 that is approximately flush with contacts of semiconductor package (not shown) when an antenna element 228 is fitted to socket 220. Fuzz button contact elements 234 are exposed on ledge 232 to make electrical contact with contacts of semiconductor package. In addition, as seen in FIG. 2B, fuzz button contact elements 234 extend through ledge 232 and make physical contact with contacts 236 of multilayer wiring board 221 when socket 220 is fitted to multilayer wiring board 221. Fuzz buttons contact elements 234 are, in general, gold plated resilient knitted wire mesh retained in a cup or attached to a threaded stud. Fuzz buttons contact elements 234 are commercially available from Tecknit, Cranford, N.J. and Cinch Connector Division, Elk Grove Village, Ill. The fuzz button contact element 234 may be replaced by an elastomeric connector inserted in the socket.

Figure 3:
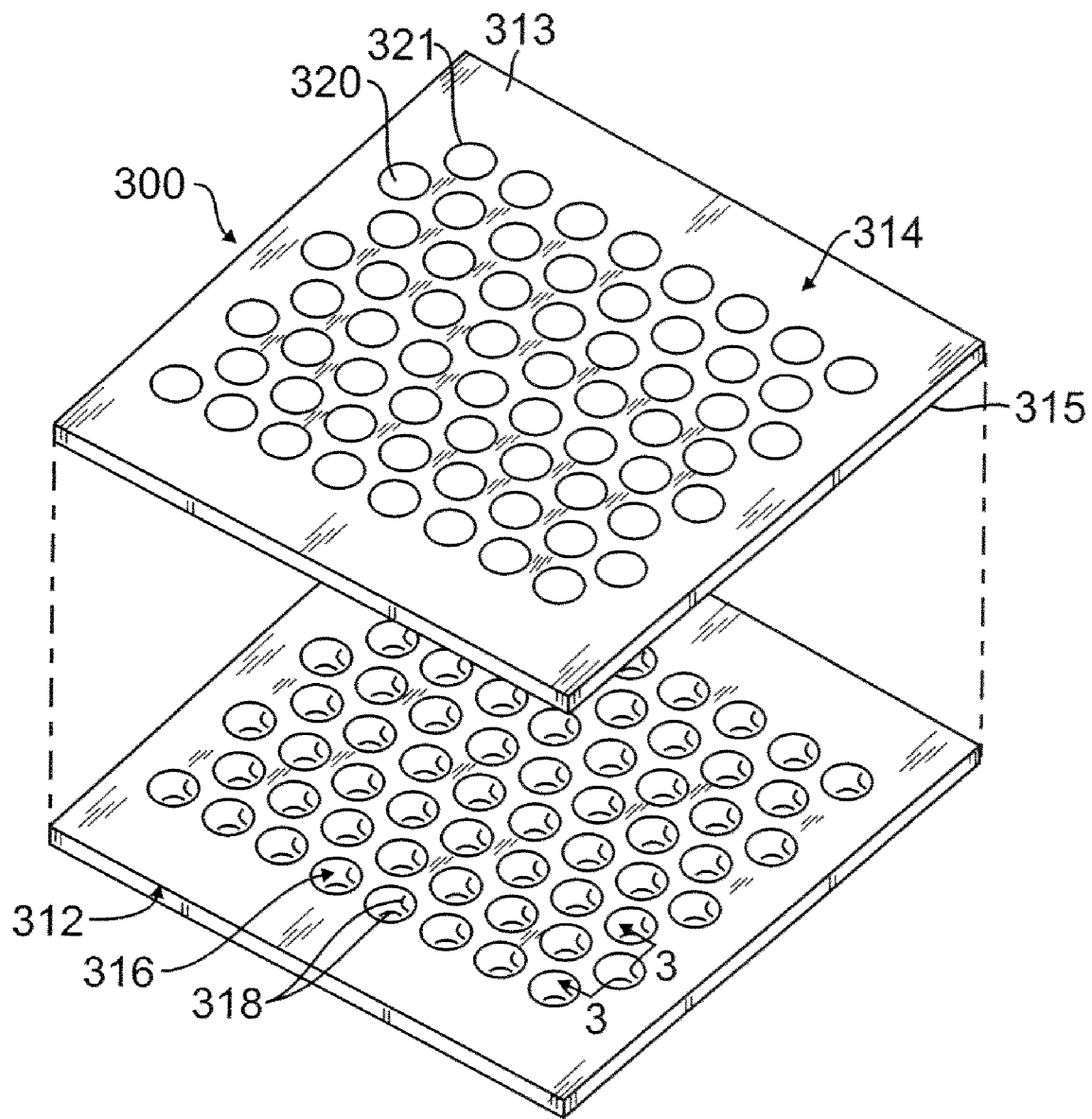
FIGS. 3, 3a and 3b show an alternate exemplary antenna for use with an embodiment of the present disclosure.

FIG. 3 is an alternate embodiment of a 64 element phased array antenna system 300 with aperture plate 314 of the current disclosure. It will be appreciated immediately, however, that the present disclosure is not limited to a 64 element phased array antenna system, but that the principles and teachings set forth herein could be used to produce phased array antenna systems having a greater or lesser plurality of waveguide transitions. The phased array antenna system 300 incorporates a multi-layer probe-integrated printed wiring board 312 and an aperture plate 314 with a plurality of waveguide transitions 320 adapted to be disposed adjacent one another in abutting relationship when fully assembled. The aperture plate 314 has a top surface 313 and a bottom surface 315. The waveguide transitions 320 have a radiating end 321, a body portion (not shown) and a coupling end (not shown). The waveguide transitions 320 extend from the radiating end 321 about the top surface 313 of the aperture plate 314 to the coupling end about the bottom surface 315 of the aperture plate 314. Conventional threaded or non-threaded fasteners (not shown) can be used to secure the probe Integrated wiring board 312 and the aperture plate 314 in close, secure abutting and operational contact.

The probe-integrated printed wiring board 312 includes a plurality of antenna elements 316 arranged in an 8×8 grid. Each antenna element 316 includes a pair of radio frequency (RF) probes 318, but it will be appreciated again that merely a single probe could be incorporated, if desired, and that greater than two probes could be included just as well to meet the needs of a specific application.

The aperture plate 314 includes a plurality of waveguide transitions 320. The coupling end of the waveguide transitions 320 are formed to overlay each of the antenna elements 316. According to an embodiment of this disclosure, the radiating end 321 of the waveguide transitions 320 may be spaced apart differently than the coupling end of the waveguide transitions 320. Detailed description of various embodiments of the aperture plate 314 will be described below.

Figure 3A:
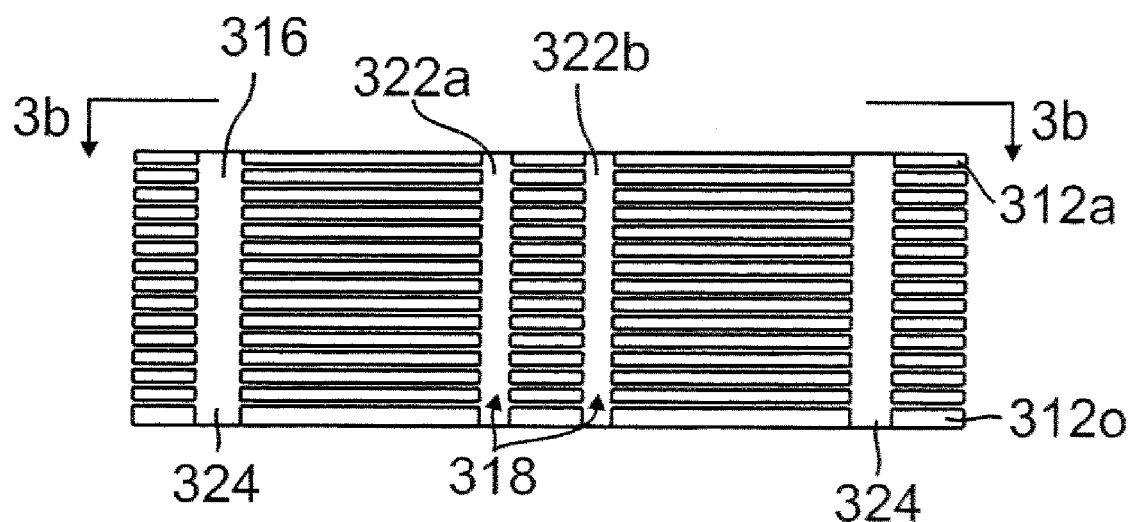

Referring to FIG. 3a, the probe-integrated printed wiring board 312 can be seen to include a plurality of independent layers 312a-312o sandwiched together. Again, it will be appreciated that a greater or fewer number of layers could be provided to meet the needs of a specific application. RF vias 322a and 322b are used to form probes 318 while vias 324 are arranged circumferentially around vias 322a and 322b to effectively form a cage-like conductive structure 326, also known as a "can" for the antenna element 316. This is illustrated in greater detail in FIG. 3b. It will be appreciated that the illustration of 20 vias to form the can 326 is presented for illustrative purposes only, and a greater or fewer number of vias 324 could be employed.

Figure 3B:
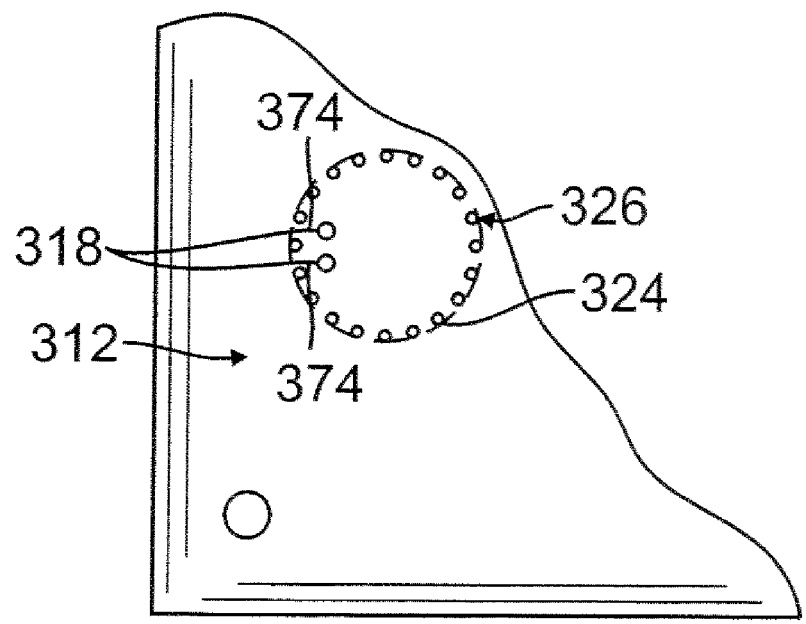

Now referring to FIG. 3b, one via 324 is shown which helps to form can 326. Via 324 may be a conductive column of material that extends through each of layers 312a-312o. Finally, one of the RF vias 318 is illustrated. Via 318 extends through each of layers 312a-312o and includes a perpendicularly extending leg 374 formed on an outer surface of layer 312a.

The antenna element 316 operatively couples to the coupling end of the waveguide transition 320. For example, via 324 at layer 312a, which is part of the cage like conductive structure 326 for the antenna element 316 operatively couples to the coupling end of the waveguide transition 320.

Each of the printed wiring boards 312 are formed through an inexpensive, photolithographic process such that each wiring board 312 is formed as a multi-layer part. The probe-integrated printed wiring board 312 includes the antenna probes 318 and DC/logic and RF distribution circuitry. On the probe-integrated printed wiring board 312, the discrete electronic components (i.e., MMICs, ASICs, capacitors, resistors, etc) can be placed and enclosed by a suitable lid or cover (not shown). Accordingly, the multiple electrical and mechanical functions of radiation, RF distribution, DC power and logic are all taken care of by the probe-integrated printed wiring board 312.

Now, various embodiments of aperture plate for use with the antenna of FIG. 1, FIG. 2 and FIG. 3 will be described in detail.

Figure 4A:
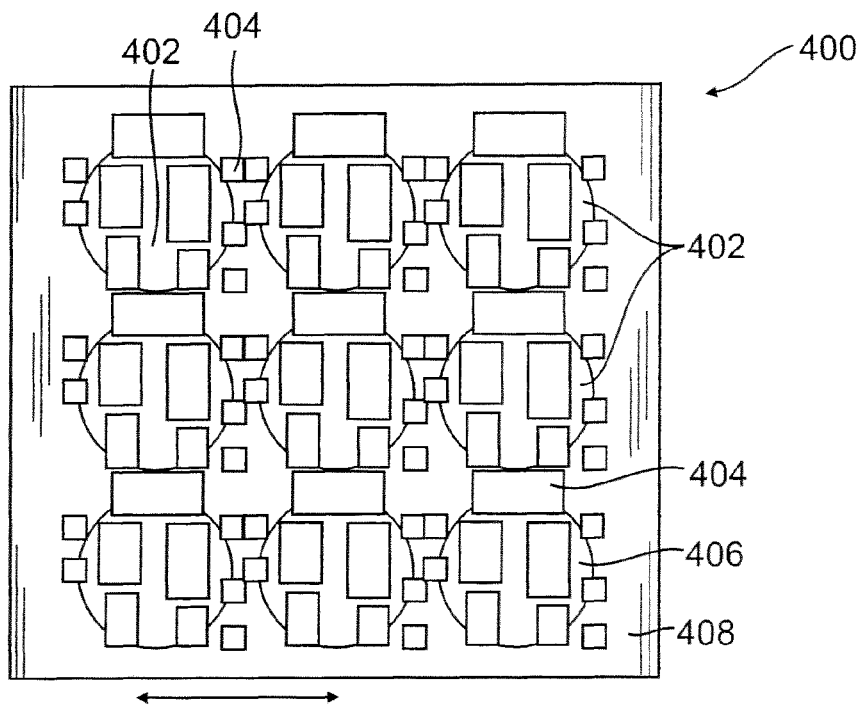
FIGS. 4a and 4b show a plan view of an aperture plate for use with an embodiment of the current disclosure.

FIG. 4a shows the plan view of an aperture plate 400, coupling end 406 of the waveguide transitions 402 and corresponding antenna elements with element electronics 404. The waveguide transition 402 further includes a radiating end (not shown) about the top surface (not shown) of the aperture plate 400. The waveguide transitions 402 extend from the coupling end 408 about the bottom surface 408 of the aperture plate to the radiating end about the top surface of the aperture plate 400.

As it can be seen from FIG. 4a, the antenna elements with element electronics 404 are overlapping in certain locations, due to the closeness of the position of the coupling ends 406. This may be caused due to various reasons.

For example, for a given pitch P1 of adjacent waveguide transitions 402, the corresponding antenna elements with element electronics 404 may overlap with each other in certain locations. This overlap may occur as the antenna element with element electronics 404 may not scale down as the adjacent waveguide transitions 402 are positioned close to each other to achieve a given pitch P1.

Similarly, for a given diameter of the waveguide transitions 402, the corresponding antenna elements with element electronics 404 may overlap with each other in certain locations. This overlap may occur as the antenna element with element electronics 404 may not scale down, as the diameter of the waveguide transitions 402 reduce.

Certain packaging layouts may not permit overlapping positioning of adjacent antenna elements with element electronics. Further, due to operating conditions, close or overlapping positioning of adjacent antenna elements with element electronics may not provide sufficient electrical or electromagnetic isolation between adjacent antenna elements and element electronics. Close or overlapping positioning of antenna elements with element electronics may induce unwarranted signal coupling or noise introduction. However, the design requirements for the aperture plate 400 may necessitate closer placement of the waveguide transitions 402 at the radiating end (not shown) of the waveguide transition 402.

Figure 4B:
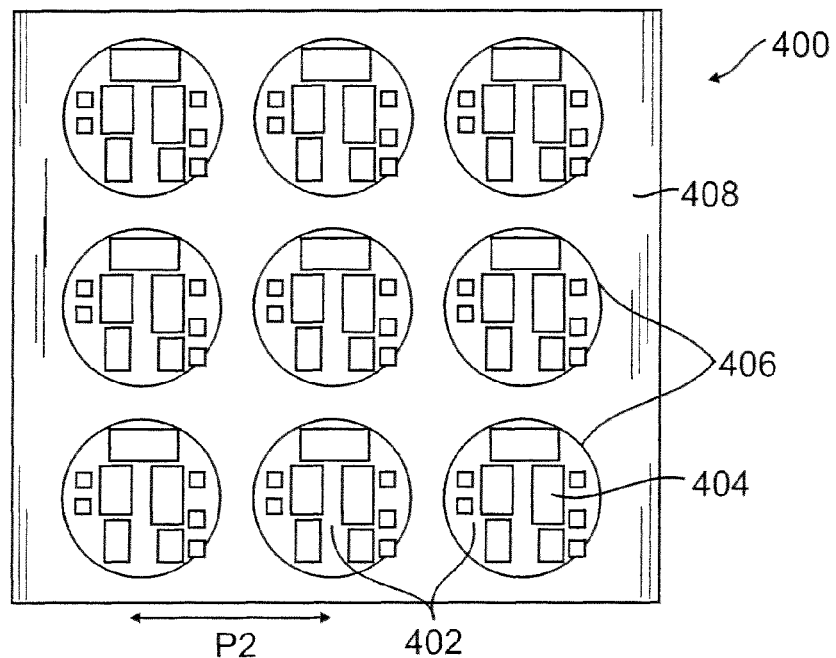

FIG. 4b shows the plan view of an aperture plate 400, coupling ends 406 of the waveguide transitions 402 and corresponding antenna elements with element electronics 404. The waveguide transitions 402 include a radiating end (not shown) and extend from the coupling end 406 about the bottom surface 408 of the aperture plate 400 to the radiating end (not shown) about the top surface (not shown) of the aperture plate 400. As shown in FIG. 4b, the waveguide transitions 402 are spaced apart such that corresponding antenna elements with element electronics 404 operatively couple with the coupling ends 406 of the waveguide transitions 402, without overlapping with adjacent antenna elements with element electronic 404. For example, the adjacent waveguide transitions 402 are spaced apart by a pitch of P2 at the coupling end.

According to an embodiment of this disclosure, the radiating end (not shown) of the waveguide transitions 404 may be spaced apart with each other, as shown in FIG. 4a, with a pitch of P1 that is less than pitch P2. A pitch of P1 at the radiating end may provide the performance characteristics of the aperture plate 400 of FIG. 4a. A pitch of P2 at the coupling end 406 may provide sufficient space at the coupling end 406 to operatively couple the antenna elements with element electronics 404 at the coupling end 406 of the waveguide transition 402.

FIG. 5 shows partial cross-sectional view of an aperture plate 500 according to an embodiment of the current disclosure. The aperture plate 500 includes the waveguide transitions 502 with a coupling end 504 about the bottom surface 506, radiating end 508 about the too surface 510 and a body portion 512 extending from the radiating end 508 to the coupling end 504. The waveguide transitions 502 are spaced apart such that at least a pair of waveguide transitions 502 are closer to each other at the radiating end 508 than at the coupling end 504.

FIG. 5a shows further details of a waveguide transition 502 with radiating end 508, coupling end 504 and a body portion 512. The waveguide transition 502 may extend from the radiating end 508 about the top surface 510 to the coupling end 504 about bottom surface 506 of the aperture plate 500. Line A-A may define an axis for waveguide transition 502. Line A-A may extend from the center of radiating end 508 to the center of coupling end 504 and passes substantially through the center of the waveguide transition 502.

According to an embodiment of this disclosure, axis A-A of at least one of the waveguide transition along a portion of the body portion 512 of the waveguide transition 502 is not normal to at least one of the top surface and the bottom surface. Line N-N extends normal to the top surface 510 of the aperture plate 500. For example, the axis A-A for waveguide transition 502 is not normal to the top surface 510 of the aperture plate, with line N-N representing a line normal to the top surface 510. Incidentally, line N-N is also normal to the bottom surface 506 and the axis A-A is not normal to the bottom surface as well.

As one skilled in the art appreciates, the height h of the waveguide transition may be varied to vary the tilt angle of the axis A-A with respect to the normal line N-N. Further, as it may be appreciated by one skilled in the art, ideally, a tilt angle of 0 degrees would be optimal. However, based upon the teachings of this disclosure, tilt angle of greater than 0 degrees may be used, without significantly affecting the performance of the antenna system. Based upon design requirements, a maximum tilt angle may be defined. The height of the waveguide transition may be suitably adjusted to maintain the tilt angle within acceptable limit.

Now referring back to FIG. 5, in one embodiment, the waveguide transitions 502 located toward the center 514 of the aperture plate 500 are substantially normal to the top surface 510 or the bottom surface 512 or both, while the waveguide transitions 502 located towards the periphery 516 of the aperture plate 500 are not normal to the top surface 510 or the bottom surface 506 or both. In an alternate embodiment, the tilt angle of the waveguide transition is changed based upon the location of the waveguide transition. For example, in one embodiment, minimal tilt angle will be maintained for waveguide transitions located near the center 514 of the aperture plate with a gradual increase in the tilt angle as the location of the waveguide transition moves toward the periphery 516, with increased tilt angle for waveguide transitions located toward the periphery 516. As one skilled in the art appreciates, various tilt angles may be used to achieve the desired lattice spacing of the waveguide transitions for a given height of the aperture plate.

Figure 6A:
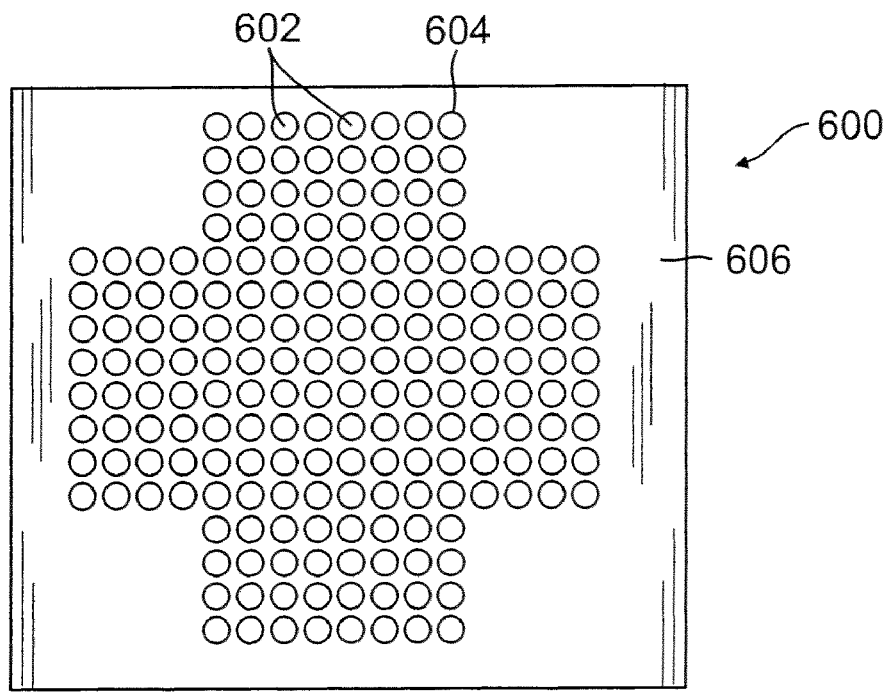
FIGS. 6a and 6b show plan views of an aperture plate for use with an embodiment of the current disclosure.

FIG. 6a shows a plan view of an aperture plate 600 showing the radiating ends 604 of a plurality of waveguide transitions 602 arranged in a first lattice arrangement about the top surface 606 of the aperture plate 600.

Figure 6B:
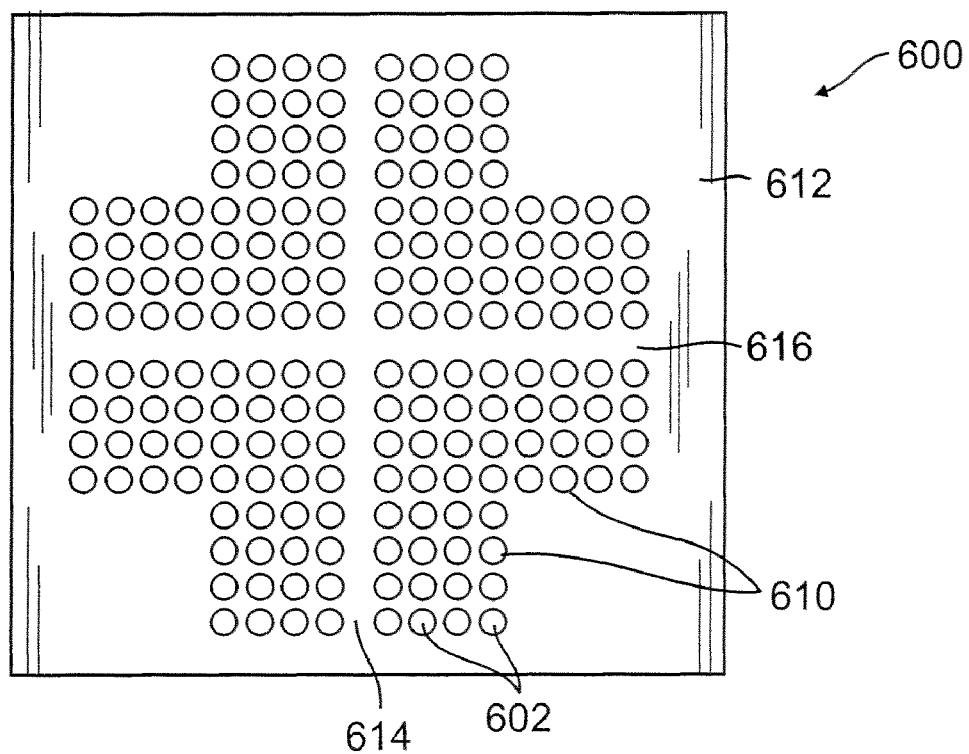

FIG. 6b shows a plan view of the aperture plate showing the coupling ends 610 of the plurality of waveguide transitions 602 arranged in a second lattice arrangement about the bottom surface 612. For example, the first lattice arrangement may provide for denser population of the waveguide transitions at the radiating end. This may be advantageously used for achieving specific performance requirements of an antenna system. For example, the second lattice arrangement at the coupling end 610 provides portions 614, 616 without the presence of the coupling ends 610 of the waveguide transitions. These portions may be advantageously used for routing or locating connecting cables at the coupling ends 610, while maintaining the preferred lattice arrangement at the radiating end of the waveguide transitions.

FIGS. 7a, 7b, 7c and 7d show an alternate embodiment of the waveguide transitions used in an aperture plate.

Figure 7A:
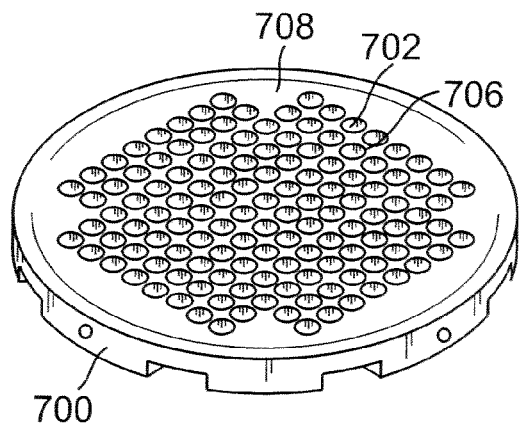
FIGS. 7a and 7b show plan views of an aperture plate for use with an embodiment of the current disclosure.

FIG. 7a shows the aperture plate 700 with radiating ends 706 of the waveguide transitions 702 placed in a lattice arrangement and spaced apart with a first spacing about the top side 708 of the aperture plate 700. For example, the waveguide transitions 702 may be spaced apart in a 0.364"×0.364" spacing configuration.

Figure 7B:
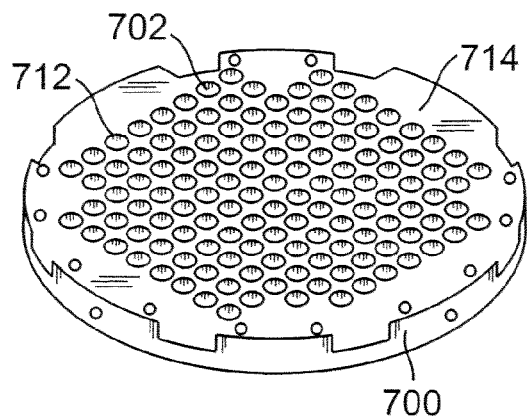

FIG. 7b showing the aperture plate 700 with connecting ends 712 of the waveguide transitions 702 placed in a lattice arrangement and spaced apart with a second spacing about the bottom side 714 of the aperture plate 700. For example, the waveguide transitions are spaced apart in a 0.384"×0.384" spacing configuration.

Figure 7C:
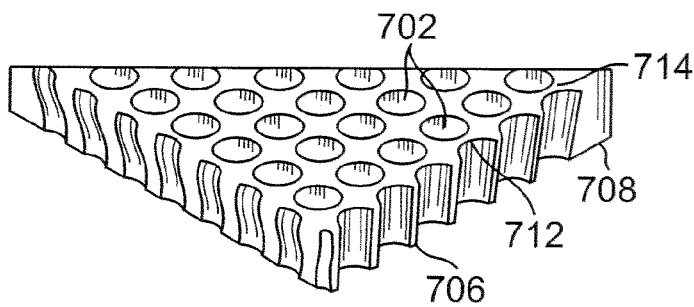
FIG. 7c shows a partial cross-sectional view of an aperture plate shown in FIGS. 7a and 7b, for use with an embodiment of the current disclosure.

FIG. 7c shows a cross section of the aperture plate 700, showing the details of the waveguide transitions 702, with a portion of the waveguide transition near the radiating end 706 normal to the top surface 708 and a portion of the waveguide transition near the coupling end 712 normal to the bottom surface 714.

Figure 7D:
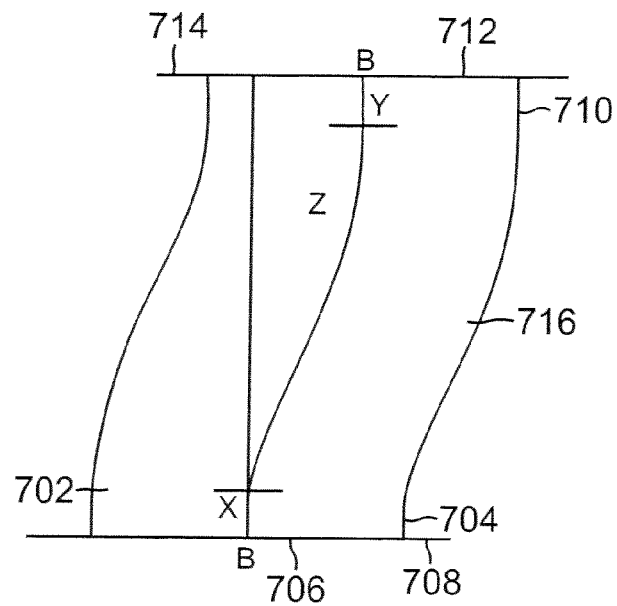
FIG. 7d shows a partial cross-sectional view of a waveguide transition of the aperture plate shown in FIGS. 7a and 7b, for use with an embodiment of the current disclosure.

FIG. 7d shows details of an alternate embodiment of the waveguide transitions for use in an aperture plate of the current disclosure. In this embodiment, the waveguide transition 702 has a portion 704 near the radiating end 706 which is substantially normal to the top surface 708. The waveguide transition 702 further has a portion 710 near the coupling end 712 which is substantially normal to the bottom surface 714. The waveguide transition 702 further has a body portion 716, portions of which are not normal to the top surface 708, bottom surface 714 or both. Line B-B may be used to define an axis for waveguide transition 702. Line B-B extends from the center of the radiating end 706 to the center of the coupling end 712 and passes through the substantial center of the waveguide transition.

In one embodiment, portion X and Z of the axis line B-B of the waveguide transition 502 is normal to the top surface 708 and bottom surface 714 respectively while portion Z of the axis line B-B of the waveguide transition is serpentine. As one skilled in the art appreciates, in one embodiment, the portion Z of the axis line B-B may be a straight line that is not normal to the top surface 708 or the bottom surface 714 or both.

Figure 8A:
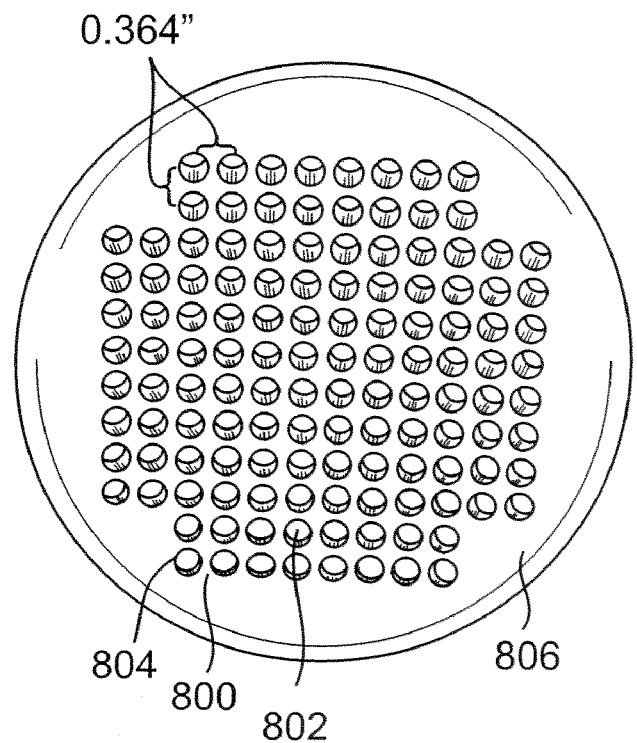
FIGS. 8a and 8b show plan view of an aperture plate for use with an embodiment of the current disclosure.
Figure 8B:
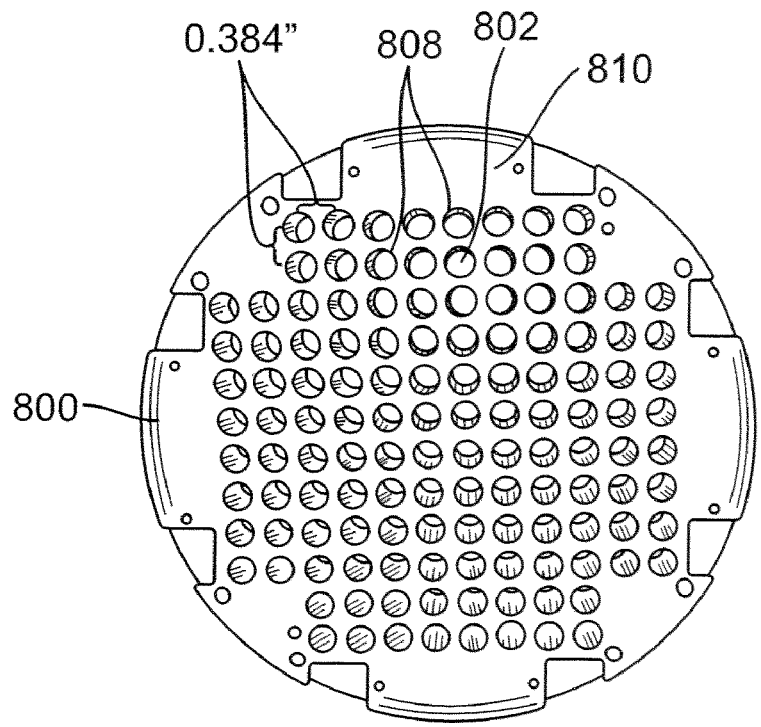

FIG. 8a shows the aperture plate 800 with radiating ends 804 of the waveguide transitions 802 are spaced apart in a first lattice arrangement about the top surface 806 of the aperture plate 800. For example, the waveguide transitions 802 may be spaced apart in a 0.364"×0.364" spacing configuration. FIG. 8b shows the aperture plate 800 with connecting ends 808 of the waveguide transitions 802 spaced apart in a second lattice arrangement about the bottom surface 810. For example, the waveguide transitions 802 may be spaced apart in a 0.384"×0.384" spacing configuration. In this embodiment, the lattice arrangement is substantially similar at both the radiating end and the coupling end, except for the spacing.

Figure 9A:
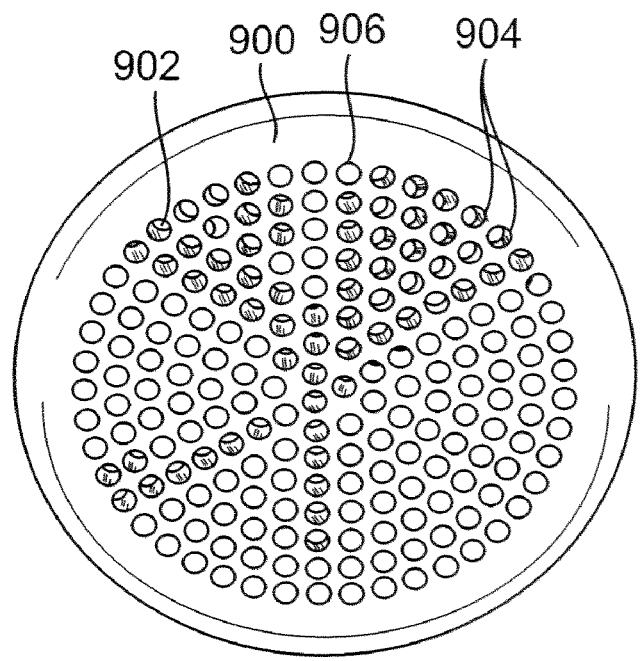
FIGS. 9a and 9b show plan views of an aperture plate for use with an embodiment of the current disclosure.
Figure 9B:
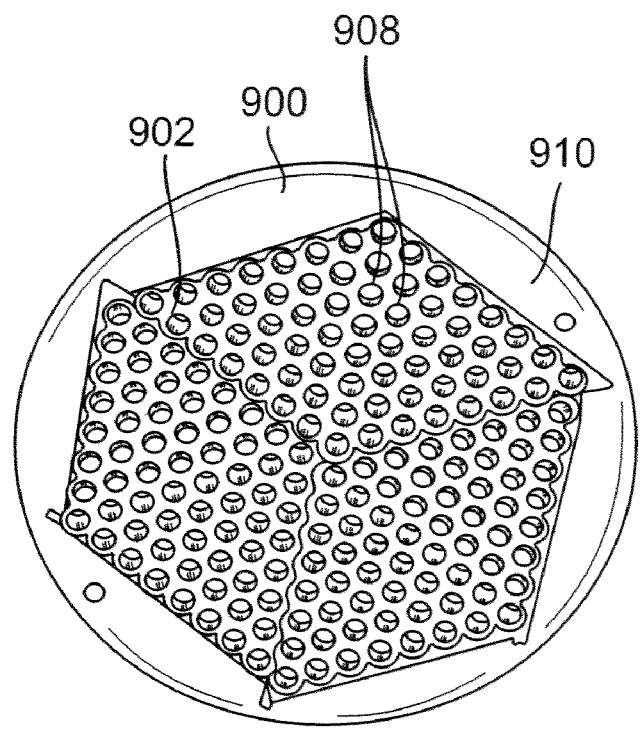

FIG. 9a shows an aperture plate 900 with radiating ends 904 of the waveguide transitions 902 placed in one lattice arrangement about the top surface 906 of the aperture plate 900. FIG. 9b shows the aperture plate 900 with connecting ends 908 of the waveguide transitions 902 placed in a different lattice arrangement about the bottom surface 910 of the aperture plate.

For example, the lattice arrangement about the bottom surface 910 is near-hexagonal formed by combining three 8×8 rhomboid arrangements. The lattice arrangement about the top surface 906 is near circular. In one embodiment, waveguide transition described with respect to FIG. 7d may be used to create the aperture plate 910. The near-hexagonal lattice arrangement about the bottom surface provides for convenient coupling of antenna elements with the waveguide transitions 902 and efficient RF routing. The near circular lattice arrangement about the top surface 906 may have a 17.6 dB sidelobe level and symmetric beam shape in all direction. As one skilled in the art appreciates, a typical rectangular lattice arrangement may have 13 dB sidelobe levels.

As an example, now referring to FIG. 9a, a near circular lattice arrangement may be formed by arranging the number of waveguide transitions in adjacent waveguide transition rings differ by approximately a multiple of $\pi$ ("Pi"). For example, the outermost waveguide transition ring in FIG. 9a has 45 waveguide transitions and the adjacent waveguide transition ring has 39 waveguide transitions, a difference of 6, approximately, twice $\pi$ ("Pi"). As one skilled in the art appreciates, other lattice arrangements at the radiating end are possible to achieve specific design and performance requirements.

As one skilled in the art appreciates, various embodiments of the waveguide transitions with alternate antenna axis may be advantageously and interchangeably use with various embodiments of the aperture plates with different waveguide transition lattice arrangements.

Figure 10:
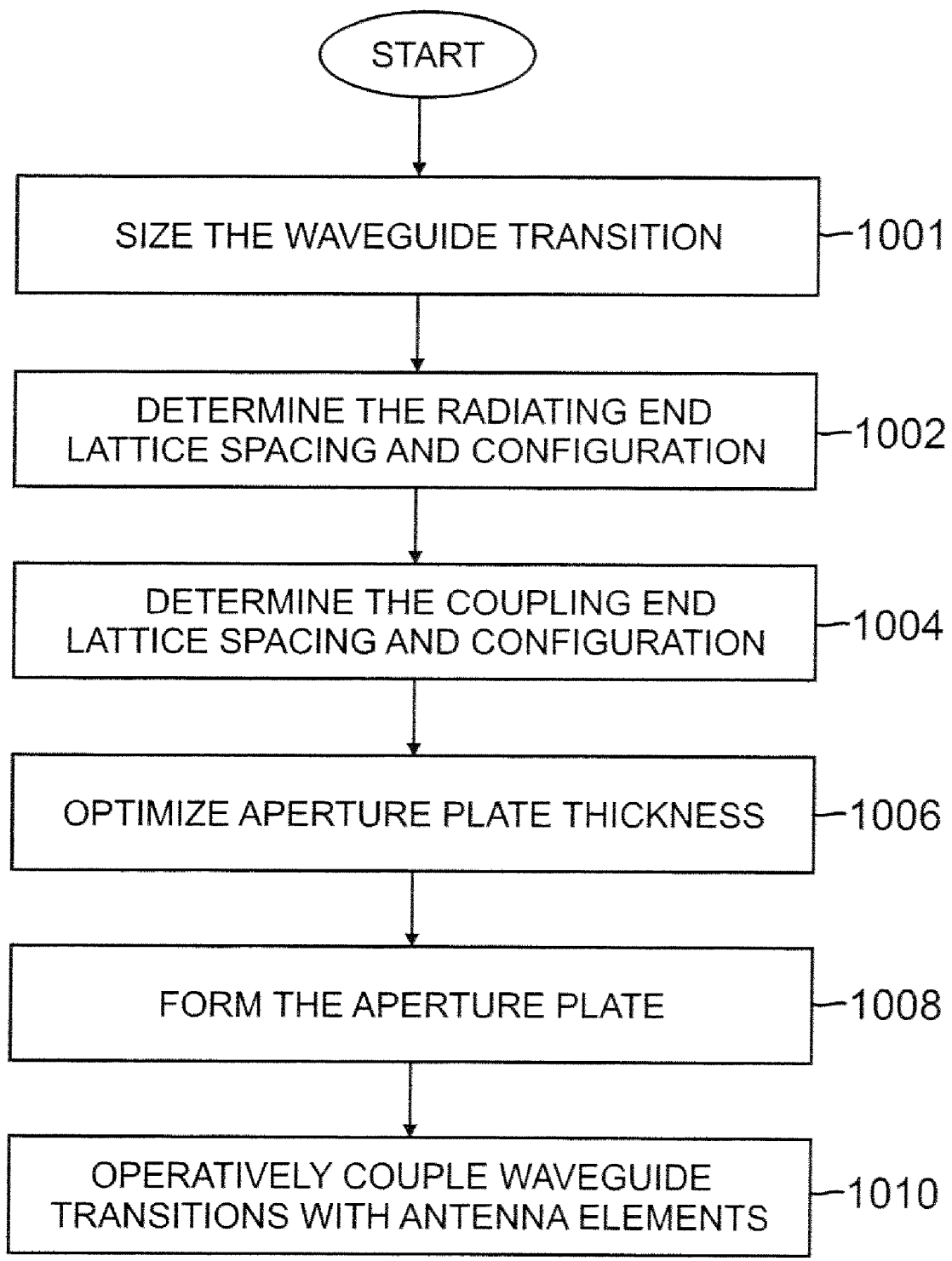
FIG. 10 shows a process flow for the manufacture of an aperture plate for use with an embodiment of the current disclosure.

Now, referring to FIG. 10, the method of manufacturing an aperture plate for a given operating requirements is disclosed. In step 1001, the waveguide transition is sized based upon the operating requirements. For example, the diameter of the waveguide transition and the dielectric to be used to achieve the operating requirements of the antenna is performed. Some of the operating requirements that may be considered in determining the size of the elements and dielectric to be used include cutoff frequency of waveguide and lowest operating frequency of antenna element.

In step 1002, the radiating lattice spacing and configuration of the waveguide transitions based upon the operating requirements is determined. Some of the operating requirements that may be considered in determining the radiating lattice spacing and configuration of the waveguide transitions include the required maximum grating lobe free scan angle in all directions, and the gain of the antenna aperture.

In step 1004, the coupling lattice spacing and configuration of the waveguide transitions based upon the antenna electronics packaging is determined. Some of the requirements that may be considered in determining the coupling lattice spacing and configuration of the waveguide transitions include the required spacing to achieve optimal isolation of antenna elements.

In step 1006, the aperture plate thickness is optimized to achieve the radiating lattice and coupling lattice spacing and configuration. Some of the criteria in determining the height of the aperture plate include achieving the radiating lattice spacing and coupling lattice spacing with minimal height of the aperture plate, without significantly impacting signal degradation. For example, the axis of the waveguide transition may have to be tilted from the normal (as previously described) to achieve the radiating lattice spacing and the coupling lattice spacing. The height of the aperture plate may be adjusted to maintain the axis of the waveguide transition tilted within a certain degree from the normal to minimize signal degradation. In an alternate embodiment, the axis of the waveguide transition may be serpentine and the height of the aperture plate is optimized to maintain the waveguide transition with acceptable signal degradation.

In step 1008, the aperture plate is formed. In one embodiment, the step of forming the aperture plate includes use of one or more of electrical discharge machining (EDM), casting, metallized plastic and 3D printing combined with modified lost-wax manufacturing processes.

In EDM manufacturing process, an electrical discharge is used to remove conductive material and form the hollow waveguide transition.

In the casting process, the aperture plate with waveguide transitions are cast using a mold.

In the metallized plastic manufacturing process, the aperture plate is plastic injection molded and the waveguide transitions are metallized using metal coating technology.

In 3D printing combined with modified lost-wax manufacturing, a 3D CAD solid model file is used to produce a pattern using a 3D printer. This pattern is then coated with a high temperature resist coating. The original 3D printed material is then removed using a solvent. The finished high temperature resist pattern is then used to cast the finished part. After casting, the internal pattern is removed from the finished part using another solvent. For example, the high temperature resist pattern may resemble the waveguide transitions of the aperture plate. The aperture plate is cast using the high temperature resist pattern and when the internal pattern from the cast aperture plate is removed using a solvent, the waveguide transitions are formed in the aperture plate. In one embodiment, the waveguide transitions are filled with dielectric material.

In step 1010, the aperture plate is operatively coupled with the antenna elements to form an antenna device. For example, the coupling ends of the waveguide transitions are operatively coupled to the antenna elements to form an antenna device.

Although the present disclosure has been described with reference to specific embodiments, these embodiments are illustrative only and not limiting. Many other applications and embodiments of the present disclosure will be apparent in light of this disclosure and the following claims.

What is claimed is:

1. An aperture plate for a phased array antenna, comprising:
a plurality of waveguide transitions, each waveguide transition having a radiating end and a coupling end and a body portion extending from the radiating end to the coupling end, the body portion characterized by a substantially constant diameter, the plurality of waveguide transitions spaced apart from each other wherein at least a pair of waveguide transitions are spaced apart closer to each other at the radiating end than at the coupling end and a projection of the radiating end partially overlaps a projection of the coupling end;
wherein the plurality of waveguide transitions extend from a top surface of the aperture plate about the radiating end to a bottom surface of the aperture plate about the coupling end;
wherein a line joining a center of the radiating end and a center of the coupling end of the waveguide transitions defines an axis of the waveguide transitions and the axis is substantially serpentine along a portion of the body portion; and
wherein the axis of at least one of the waveguide transitions is not normal to at least one of the top surface and the bottom surface.

2. The aperture plate of claim 1, wherein one or more of the waveguide transitions are operatively coupled to an antenna element at the coupling end.

3. The aperture plate of claim 1, wherein the top surface and the bottom surface of the aperture plate are substantially parallel to each other.

4. The aperture plate of claim 1, wherein the plurality of waveguide transitions are hollow.

5. The aperture plate of claim 1, wherein the plurality of waveguide transitions are filled with a dielectric.

6. The aperture plate of claim 1, wherein the plurality of the waveguide transitions form a lattice pattern on the aperture plate at the radiating end and the coupling end, the lattice pattern formed on the aperture plate at the radiating end is different than the lattice pattern formed on the aperture plate at the coupling end.

7. The aperture plate of claim 1, wherein the axis of the waveguide transition near the coupling end is substantially normal to the bottom surface.

8. The aperture plate of claim 1, wherein the axis of the waveguide transition near the radiating end is substantially normal to the top surface.

9. A method of manufacturing an aperture plate for a phased array antenna, comprising:
sizing a plurality of waveguide transitions based upon certain operating requirements;
wherein the plurality of waveguide transitions extend from a top surface of the aperture plate about a radiating end to a bottom surface of the aperture plate about a coupling end and a projection of the radiating end partially overlaps a projection of the coupling end, each of the waveguide transitions further comprising a body portion characterized by a substantially constant diameter;
wherein a line joining a center of the radiating end and a center of the coupling end of the waveguide transitions defines an axis of the waveguide transitions and the axis is substantially serpentine along a portion of the body portion of the waveguide;
determining a radiating lattice spacing and configuration based upon the operating requirements;
determining a coupling lattice spacing and configuration based upon antenna electronics packaging;
optimizing an aperture plate thickness to achieve the radiating lattice and the coupling lattice spacing and configuration; and
forming the aperture plate.

10. The method of claim 9 further comprising the step of filling the plurality of waveguide transitions with dielectric material.

11. The method of claim 9, wherein the step of forming the aperture plate includes one or more of EDM, casting, metallized plastic and 3D printing with modified lost-wax process.

12. The method of claim 9 further comprising the step of operatively coupling the aperture plate with antenna elements to form an antenna device.

13. A phased array antenna comprising:
an aperture plate with a plurality of waveguide transitions, each waveguide transition having a radiating end and a coupling end and a body portion extending from the radiating end to the coupling end, the body portion characterized by a substantially constant diameter, the plurality of waveguide transitions spaced apart from each other;

wherein at least a pair of waveguide transitions are spaced apart closer to each other at the radiating end than at the coupling end, and a projection of the radiating end partially overlaps a projection of the coupling end;

wherein the plurality of waveguide transitions extend from a top surface of the aperture plate about the radiating end to a bottom surface of the aperture plate about the coupling end, a line joining a center of the radiating end and a center of the coupling end of the waveguide transition defines an axis of the waveguide transition, and wherein the axis is serpentine along a portion of the body portion, normal to the top surface near the radiating end and normal to the bottom surface near the coupling end; and a plurality of antenna elements operatively coupled to one or more of the waveguide transitions at the coupling end.

14. The antenna of claim 13, wherein the plurality of waveguide transitions form a lattice pattern on the aperture plate at the radiating end and the coupling end, the lattice pattern formed on the aperture plate at the radiating end is different than the lattice pattern formed on the aperture plate at the coupling end.

* * * * *